Sept. 22, 1936.    W. T. BRADBURY    2,055,246
ELECTRIC RANGE
Filed Nov. 15, 1928    4 Sheets-Sheet 1
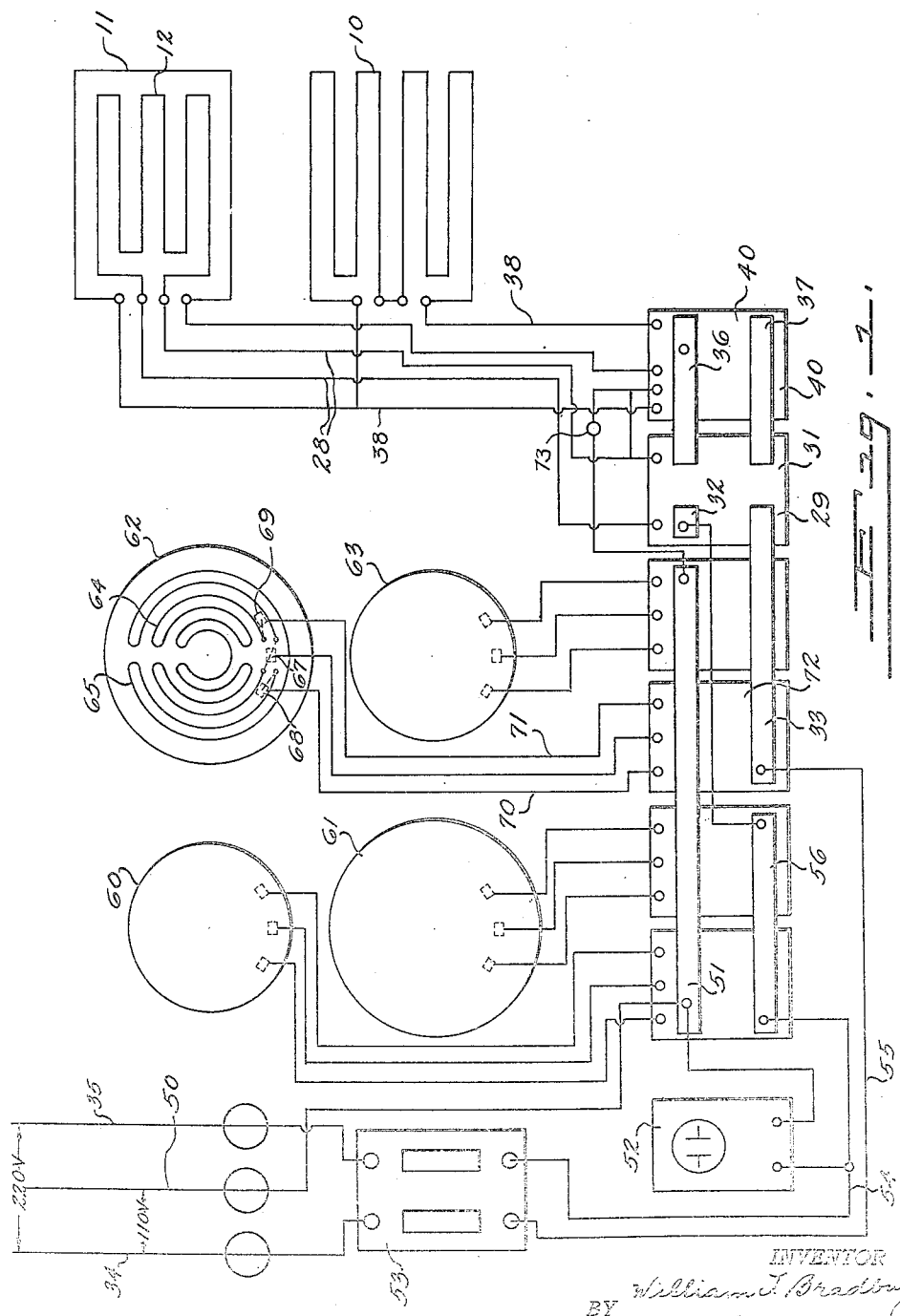

Sept. 22, 1936.    W. T. BRADBURY    2,055,246
ELECTRIC RANGE
Filed Nov. 15, 1928    4 Sheets-Sheet 2
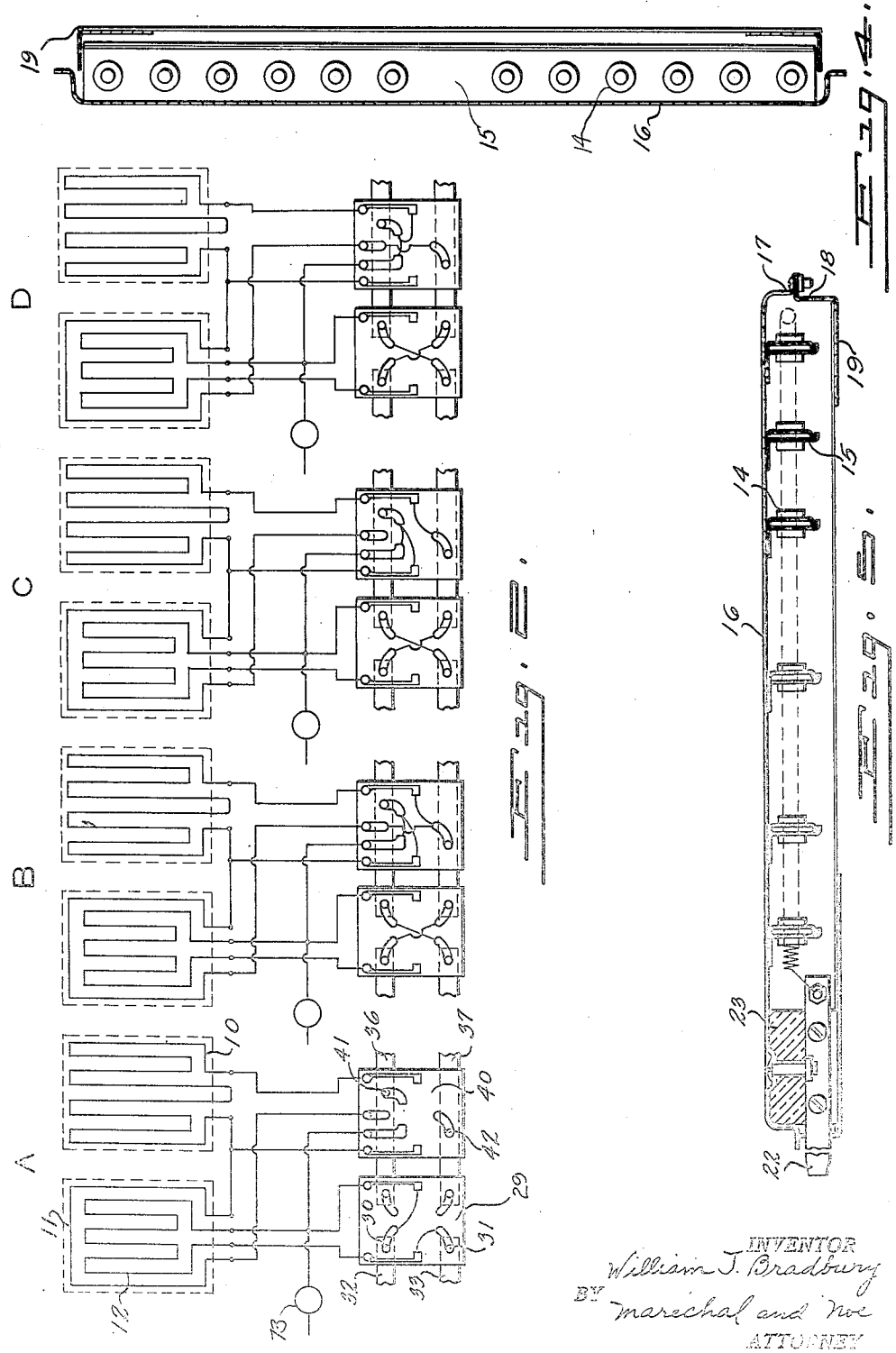

Sept. 22, 1936.  W. T. BRADBURY  2,055,246
ELECTRIC RANGE
Filed Nov. 15, 1928  4 Sheets-Sheet 3
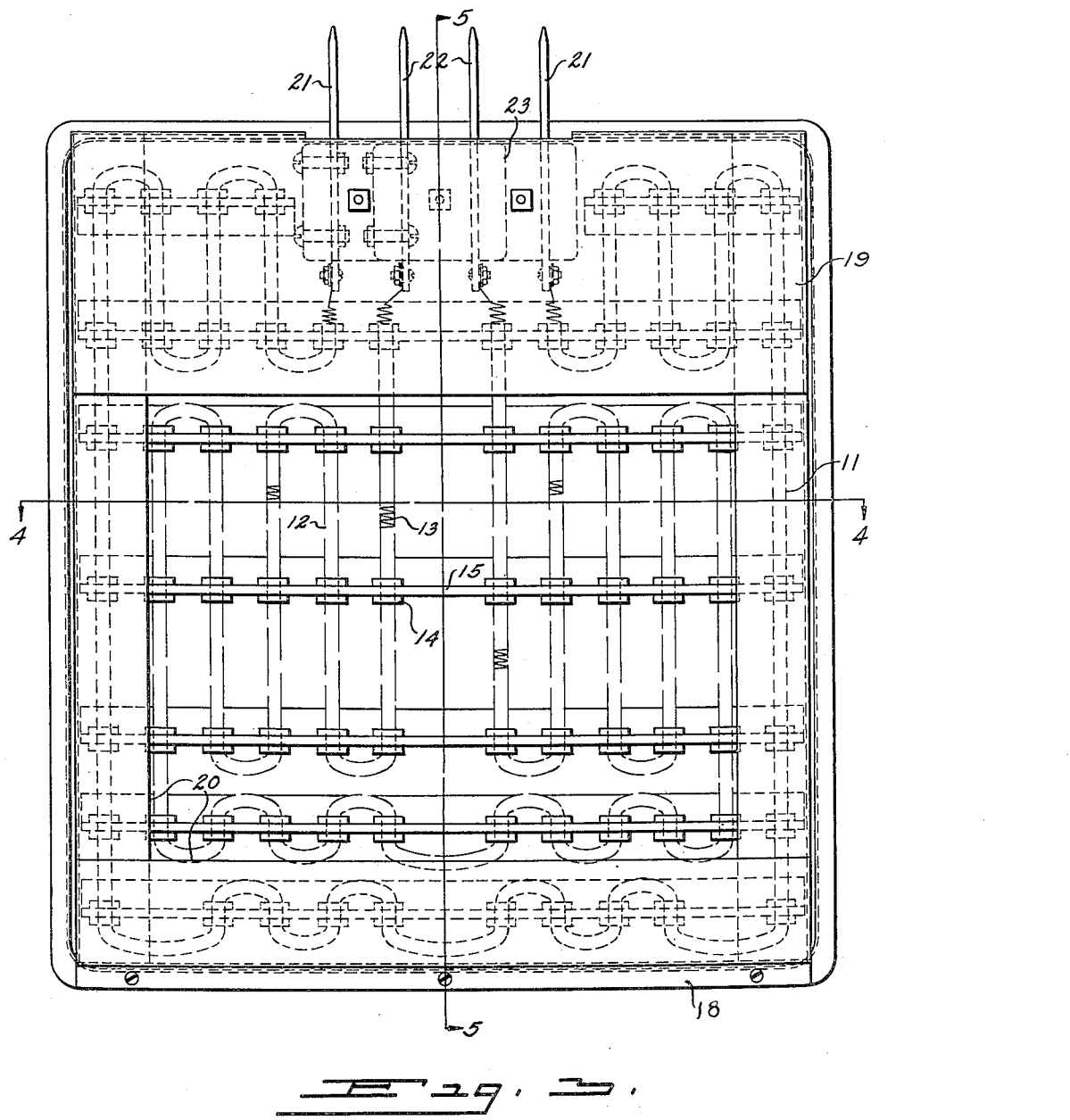
INVENTOR
BY William T. Bradbury
maréchal and Noe
ATTORNEY Sept. 22, 1936.   W. T. BRADBURY   2,055,246
ELECTRIC RANGE
Filed Nov. 15, 1923   4 Sheets—Sheet 4

INVENTOR
William T. Bradbury
BY Marechal and Noe
ATTORNEYS

Patented Sept. 22, 1936

2,055,246

UNITED STATES PATENT OFFICE 2,055,246

ELECTRIC RANGE

William T. Bradbury, Hamilton, Ohio, assignor to The Estate Stove Company, Hamilton, Ohio, a corporation of Ohio Application November 15, 1928, Serial No. 319,493

24 Claims. (Cl. 219—20)

This invention relates to the arrangement and control of heating elements for electric ranges.

One object of the invention is the provision of a heating element arrangement for electric ranges in which various heating elements may be controlled in a variety of ways so as to connect them to a power source without unbalancing the service lines.

Another object of the invention is the provision of a heating element arrangement for electric ovens having top and bottom baking elements, the top baking element having less heating capacity than the lower baking element so that uniform oven heat is obtained, means being provided for connecting the heating elements to a power source without unbalancing the service lines.

A further object of the invention is the provision of a heating element arrangement of this character in which there is a top broiling element which may be used independently of the baking elements, the controls for the baking and broiling elements being interrelated so that the broiling element cannot be used with the baking elements.

Another object of the invention resides in the control of broiling and baking elements of different heat capacities in such a way that simple control of the various elements is provided for.

Other objects and advantages of the invention will be apparent from the following description and from the accompanying drawings in which—

Fig. 1 is a diagrammatic showing of the various heating elements and electrical connections of an electric range embodying the present invention;

Fig. 2 is a diagram showing the various ways in which the oven heating elements are connected to a power source;

Fig. 3 is a bottom plan view of the combined broiling and top baking elements of an electric oven;

Fig. 4 is a section on the line 4—4 of Fig. 3, through the entire top heating unit;

Fig. 5 is a section on the line 5—5 of Fig. 3;

Figure 6:
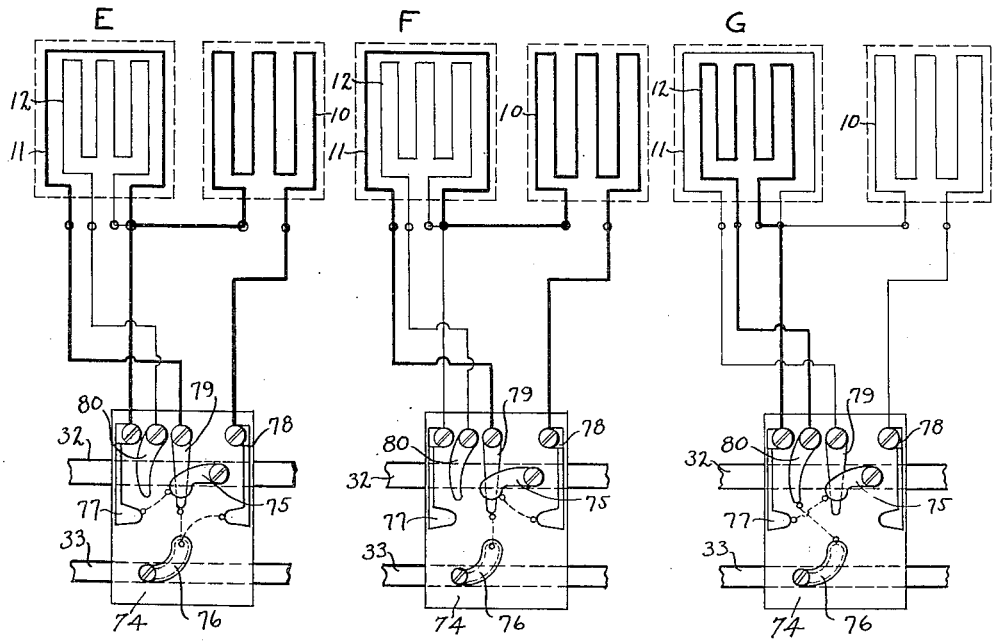
Fig. 6 is a diagrammatic showing of a form of the invention in which the baking and broiling elements are controlled from a single switch.

Referring more particularly to the drawings by reference numerals, and first with regard to Figs. 1 to 5, 10 indicates the lower heating or baking element of an electric range oven. 11 is a top heating or baking element of the oven, and 12 is another top heating element independent of the element 11, and used in broiling operations.

As shown in Figs. 3, 4, and 5 the top baking element 11 surrounds and encloses the broiling element 12, the two elements being formed of suitable resistance wire 13 which is held in porcelain collars 14 through which the wires are threaded. The various holding collars 14 are mounted in bars 15 preferably of sheet metal, these bars being supported by the top metal plate 16 in any suitable manner. This top plate 16 preferably extends downwardly at its front and rear edges to provide flanges 17 to which are fastened corresponding flanges 18 of the bottom plate 19 preferably provided as a lower shield surface for the outer portion of the resistance wire constituting the top baking element of the oven. The lower plate 19 is provided with a central opening of comparatively large size so that the broiling element 12, which is arranged substantially within the confines of the opening 20, is not shielded on its lower side, so that the hot wires are in direct heat radiation relationship with food below it. The opposite ends of the baking element 11 are connected to suitable terminal plugs 21, and the opposite ends of the broiling element 12 are connected to other terminal plugs 22 these plugs being arranged in a suitable porcelain base 23 at the rear side of the top oven unit.

The lower baking element 10 is constructed generally in a manner similar to that of the top baking element, a top shield or protector surface of sheet metal being preferably provided however over the entire extent of this lower baking element. The three elements 10, 11, and 12 are preferably adapted to operate effectively on the maximum voltage of a three wire current source of 220 volts or the like, for example.

The lower baking element 10, and the top baking element 11 are so proportioned as to size or heat capacity as to maintain an even oven temperature suitable for baking purposes, these elements being used together for baking. As the heated air in the oven naturally rises and some heat of course radiates from the top baking element to heat the food from above, in accordance with this invention the capacity of the top heating element is about half that of the lower baking element or from about 40% to 70% of the latter dependent upon the oven form and insulation, and thus when both elements are effective the oven temperature will be substantially uniform throughout. The capacity of the broiling element 12 is preferably somewhat less than that of the lower baking element, and greater than that of the top baking element, this top broiling element 12 being used for broiling purposes when the baking elements are ineffective. It has been found desirable when the capacity of the lower baking element 10 is 2200 watts capacity to provide a top baking element of 1200 watts and a broiling element of about 2000 watts, these figures being given for exemplary purposes only.

Means are provided to connect the various heating elements 10, 11, and 12 to the 220 volt power source so that desired oven temperatures may be attained without unbalancing the oven heat, and without unbalancing the power drain on the service lines. As shown in Figs. 1 and 2 showing an embodiment of the invention adapted for manual control of the various heating units the top broiling element 12 is connected by means of leads 28 to a separate on and off switch 29, the live terminals 30 and 31 of which are connected to busses 32 and 33, these busses being connected, as shown, to 220 volt three wire service leads or the like, indicated at 34 and 35. By means of this switch the top broiling element 12 may be connected to or disconnected from the 220 volt source. When the switch is energized the live terminals are connected, as shown at A in Fig. 2, to the element 12, which is thus supplied with 220 volts.

The lower baking element 10, and the top baking element 11 are connected by leads 38 to a three heat switch 40 of any suitable or well-known construction by means of which the various baking elements may be connected to the 220 volt or other power source. The switch 40 which controls the baking elements is provided with live terminals 41 and 42 which are connected to the busses 36 and 37, and the switch connection is such that for high heat the terminals 41 and 42 are connected to the wires leading to the baking elements as shown at B in Fig. 2 to place both the top and the lower baking elements in parallel across the 220 volt source. For medium heat in a baking operation the terminals 41 and 42 may be connected to the baking elements as shown at C in Fig. 2, so that the top baking element is not energized, while the lower baking element 10 is connected across the 220 volt service line. The switch may be turned further to the fourth position as shown at D in Fig. 2, so that the terminals 41 and 42 connect the baking elements in series across the 220 volt line for low heat. In the off position of this baking switch, as shown in the position A of Fig. 2 neither the top nor the bottom baking elements are connected to the power source. It will be understood that the three heat switch may be moved successively from the off position to the high heat, the medium heat or the low heat positions as just described to energize the baking elements in a manner to obtain the desired oven temperature and in the various switch positions it will be understood that the service lines are always in electrical line balance since the elements are connected across the 220 volt service wires. At the start of the baking operation the baking elements may be placed in parallel across the 220 volt line for high heat conditions, and after the oven has been heated up and the food inserted, the temperature of the oven may be maintained under low heat conditions until the baking is completed. A pilot light 73 can be connected as shown in Figs. 1 and 2 which will indicate when either the baking or broiling switches are in any of the on positions.

The operation of the switch 29 which controls the broiling element 12 is independent of the operation of the switch 40 which regulates the baking elements, and when a broiling operation is to be conducted, the baking elements are not energized, but the comparatively large broiling element, located at the top of the oven produces sufficient heat for the broiling of food in a satisfactory manner, all of the heat coming from the top of the oven in an unrestricted and unshielded manner as the broiling element is in direct heat radiation relationship with the food. Preferably, to prevent improper use of the heating elements and to maintain a proper heat balance and power drain, the switches 29 and 40 are interlocked to prevent the broiling and baking elements from being energized at the same time. The switch 29 is accordingly so connected to the busses 32, 33 and 36, 37 as to energize the busses 36, 37 only when the switch 29 is not supplying power to the broiling element. This broiling switch is therefore arranged, as shown at A in Fig. 2, to cut off the power supply to busses 36, 37 when it is connected to the broiling element, and to connect busses 36 and 37 to busses 33 and 32 to energize the former when the broiling element is turned off. Regardless of the position of switch 40 therefore, the baking elements cannot be heated unless the broiling element is turned off.

The 220 volt service line, having a third or neutral wire 50, provides the two 110 volt sources between this neutral wire 50 and the wires 34 and 35. The neutral wire 50 extends to a neutral bus 51 which may be connected to a convenient appliance receptacle 52 as shown. The service wires 34 and 35 go to a suitable fuse block 53 from which extend the wires 54 and 55 leading to the 220 volt busses 56 and 33 respectively. One of these busses in conjunction with the neutral bus provides power for two of the cooking top units 60 and 61 and the other bus 33 provides power for the cooking top units 62 and 63.

Each cooking top unit is preferably constructed as shown in Fig. 1 of two separate heating elements 64 and 65, the element 64 being arranged in the central portion of the cooking top while the element 65 is arranged in the outer or peripheral portion of the cooking top, and surrounding the element 64. The wires of these units are arranged semicircularly extending back and forth as shown, so that no hot spots are present, as adjacent wires are uniformly spaced apart. Each of these units is adapted to be supplied with 110 volts, the two heating elements 64 and 65 being interconnected to a neutral terminal 67 so that the two terminals from each of the heaing elements may be connected in parallel across 110 volts for maximum heating conditions of the cooking top units, both elements of the unit being heated under such conditions. As shown in Fig. 1 the terminals 68 and 69 of the two cooking top units 64 and 65 are connected by wires 70 and 71 to the terminals of a three heat switch 72 by means of which one of the elements 64 or 65 may be connected across the 110 volt side of the service line while the other element remains ineffective or disconnected. This is for medium heat conditions. For high heat conditions the two heating elements 64 and 65 are both connected in parallel across the 110 volt line and for low heat they are connected in series across the 110 volt line. It will now be apparent, that the power supplied to the cooking top units is practically equalized on the service line under normal conditions.

In the embodiment of the invention shown in Fig. 6, to which reference is now made, the baking and broiling elements are connected or energized by means of a single switch incorporating within itself means preventing the simultaneous energization of the broiling element and the baking elements. This switch, designated generally 74, has an on and off position, a high baking heat position, a low baking heat position, and a broiling position. The sequence of these switch positions is preferably in the order just named. The two bus bars 32 and 33 supply current at 220 volts or at some other suitable voltage to the live clips 75 and 76. In position E of Fig. 6, for high heat baking conditions, the clip 75 is electrically connected by a movable switch part to a terminal 77 connected to both baking elements, and terminals 78 and 79, connected to the lower baking element 10 and upper baking element 11, respectively, are connected electrically, as shown in dash lines, to the live clip 76. At another position of the movable switch member, the details of which are not shown as it may be of any suitable construction, the baking elements are connected in series, for low heat conditions, as shown at position F of Fig. 6. Here the live clip 76 is electrically connected to the terminal 79 while clip 75 is connected to terminal 78 so that the two baking elements are connected in series across the 220 volt line. Under these conditions the live clips of the switch are not connected at all to the terminal 80 of the broiling element 12 so the latter is not heated. As shown in position G of Fig. 6 the broiling element is connected across the service line, terminal 80 being connected to clip 76 while terminal 77 is connected to clip 75. When the broiling element is connected in this manner the baking elements cannot be energized, and the arrangement therefore is such as to prevent the simultanous use of both broiling and baking elements, although either the broiling element or the two baking elements may be connected and energized alone when desired.

Figure 7:
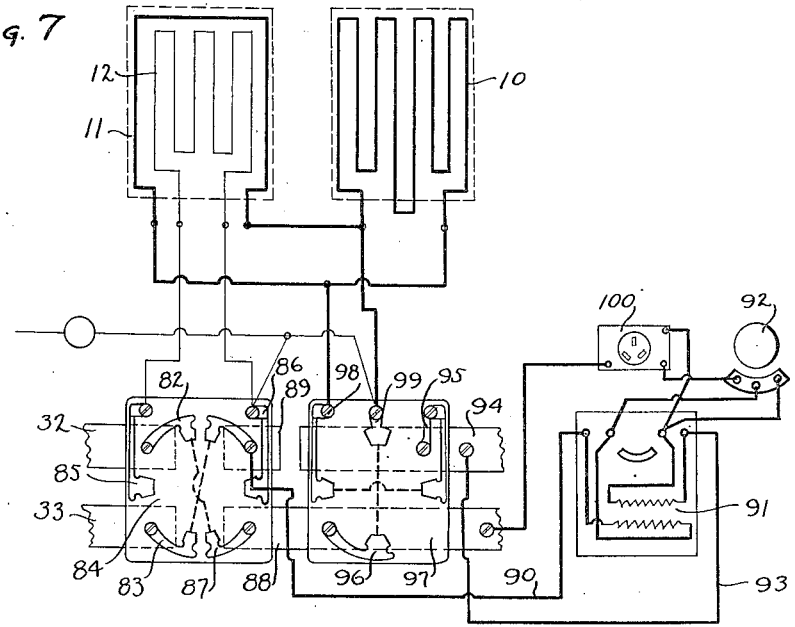
Fig. 7 is a showing of another form of the invention employing a thermostat for automatically maintaining desired baking heat.

The switching and heating element arrangement as shown in Fig. 6 may incorporate with it an automatic arrangement for maintaining a desired temperature in the oven for baking conditions. In such case the thermostat control may be connected in series with one of the connections from a baking element to a switch. The embodiment of the invention shown in Figs. 1 to 5 may also be provided without material change with a thermostat control providing for automatically making and breaking an electrical connection from one of the baking elements to the control switch means, and under such conditions manual as well as automatic control of the baking heat may be obtained. However, where the range is adapted to operate automatically by means of a thermostat control, the connections are preferably as shown in Fig. 7, since when a thermostat control is provided the switching arrangement may be considerably simplified in accordance with the disclosure of this figure. As here shown, the bus bars 32 and 33 are connected to the live terminals 82 and 83 of a control switch 84. In one position of the movable element of this switch the live terminals 82 and 83 are connected to the terminals 85 and 86 respectively of the top broiling element 12. When the switch is so positioned, the terminal 87 of the auxiliary bar 88 is not energized and the baking elements are not heated. However, when the switch 84 is operated to turn off the broiling element 12, the connections are as shown in this figure in dotted lines and the auxiliary bus bars 88 and 89 are energized. Auxiliary bus bar 89 is electrically connected by wiring 90 and switch mechanism 91 to a thermostat control 92 and wiring 93 to auxiliary bus bar 94. Auxiliary bus bar 94 is provided with a connecting clip 95 and bus bar 88 has a live clip 96 of oven switch 97. The two baking elements 11 and 10 are electrically connected to two terminals 98 and 99 of this switch which are connected as shown in dotted lines to the two bus bars when the circuit is closed through the thermostat control device. The thermostat control is provided with a heat sensitive element which is subjected to the heat of the oven so that when a desired oven temperature is obtained a relay in the switch means 91 is effective to cut off or interrupt the current flow through the wire 93, and thus cut off the baking elements from the electrical supply. When the oven heat attains some predetermined temperature, which may be regulated by adjustment of the thermostat, an electrical connection again obtains through the switching mechanism and current again flows to the baking elements. A suitable clock receptacle 100 may be provided for timing the starting or stopping or both the starting and stopping of the heating operation, this clock receptacle being well-known in the art so that its detailed construction need not be set forth.

It will be apparent, that in accordance with the construction just described either the baking elements or the broiling element may be energized alone, but both cannot be energized together, and consequently the demand on the service lines that can be imposed under any conditions is maintained at a minimum while permitting the proper operation of the various elements. The various oven heating elements can only be connected to the service lines in electrical line balance and voltage fluctuation or variations due to the imposition of more load on one side of a three wire line than on the other therefore never obtain.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An electric heating element arrangement for an electric oven comprising, in combination, a lower baking element and a top baking element of considerably less capacity than the lower baking element whereby an even distribution of heat is obtained within said oven, a top broiling element, all of said elements being located within said oven, and switch means for connecting said elements in a predetermined manner to a power source including means for preventing the energization of said top baking element with said top broiling element.

2. An electric heating element arrangement for an electric oven comprising, in combination, a lower heating element and a top heating element of considerably less capacity than the lower heating element to provide for an even distribution of heat in said oven, means preventing direct radiation from said elements into the oven space, a top broiling element permanently positioned within said oven at the top thereof, switch means for connecting said elements in a predetermined manner to a power source, said broiling element having a capacity less than that of the lower heating element, and greater than that of said top heating element.

3. An electric heating element arrangement for electric ovens adapted to produce an even distribution of heat throughout the oven space comprising in combination a lower baking element and a top baking element of less capacity than said lower baking element positioned at the top of said oven in proximity to the side wall thereof, means preventing direct radiation from said baking elements into said oven, a top broiling element located centrally of said top baking element adapted for directing downward radiation into the oven space, switch means for said elements, and provision for preventing simultaneous energization of said broiling element with said baking elements.

4. An electric heating element arrangement for electric ovens comprising, in combination, a lower baking element, a top baking element of less capacity than said lower baking element and having a lower metal shield surface, and a top broiling element, a power source, and switch means for connecting said elements to the power source, said broiling element being arranged within the top baking element and having a capacity greater than said top baking element.

5. An electric heating element arrangement for an electric oven comprising a broiling element at the top of the oven having an unprotected lower surface, and a top baking element arranged around said top broiling element and provided with a lower metal shield surface, and means for energizing said elements.

6. An electric heating element arrangement for an electric oven comprising a broiling element at the top of the oven having an unprotected lower surface, a top baking element arranged around said top broiling element, means for selectively energizing said elements, and means preventing simultaneous energization of said elements.

7. An electric heating element arrangement for an electric oven comprising a broiling element at the top of the oven having an unprotected lower surface, a top baking element arranged around said top broiling element, a lower baking element having considerably greater heating effect than said top baking element means preventing direct radiation from said baking elements into said oven, means for energizing said elements, said means having provision preventing energization of said broiling element with a baking element.

8. An electric heating arrangement for electric ovens comprising a top broiling element having an unobstructed lower surface adapted to direct radiant energy toward the material to be heated, a top baking element positioned adjacent the periphery of said broiling element and provided with a lower heat shield surface to protect the material being heated from direct radiant energy, and means for energizing said elements.

9. An electric heating arrangement for electric ovens comprising a top broiling element having a lower exposed surface adapted to direct radiant energy toward the material to be heated, a top baking element positioned adjacent the periphery of said broiling element and provided with a lower heat shield surface to protect the material being heated from direct radiant energy, a bottom baking unit of greater capacity than said top baking unit, the relative capacities being so chosen that an even distribution of heat throughout said oven is obtained, and a power source for energizing said units.

10. An electric heating element arrangement for electric ovens comprising a broiling element at the top of said oven having an unprotected lower surface, a top baking element arranged around said broiling element and provided with a lower heat shield surface, a lower baking element, a source of power, switch means for connecting said broiling element to said source in one position and for establishing a circuit from said source to said baking elements in another position, whereby said baking elements are energizable only when said broiler is disconnected, and means for selectively connecting said baking elements to said source to obtain a varied range of heats.

11. An electric heating arrangement for electric ovens comprising, a broiling element, a top baking element, a bottom baking element of greater capacity than said top baking element providing for substantially even distribution of heat throughout said oven, all said elements being positioned to direct heat into the oven, switch means for connecting said baking elements to a source of power, a second switch means for connecting said broiling element to said source of power and adapted to interrupt the connections from said baking elements to said source of power when said broiling element is connected to said source, and thermostatic means in circuit with the first mentioned switch means and the baking elements for also controlling the connection of said baking elements to said source to maintain a constant temperature within said oven.

12. An electric heating arrangement for electric ovens comprising, a broiling element, a top baking element, a bottom baking element of greater capacity than said top baking element, all said elements being positioned to direct heat into the oven, a source of power for energizing said elements, switch means for controlling the connection of said baking elements to said source to obtain a plurality of different heats, said switch means preventing the simultaneous energization of a baking with a broiling element, and thermostatic means for controlling the energization of said baking elements simultaneously in one position of said switch means to maintain a substantially uniform temperature within said oven.

13. An electric heating arrangement for electric ovens comprising, a broiling element, a top baking element, a bottom baking element, a source of power, switch means operable to one position to connect said baking elements in parallel across said source for high heat and to a second position to connect said baking elements in series with said source for low heat and to a third position to connect said broiling element to said source and to disconnect both of said baking elements from said source.

14. An electric oven comprising in combination side and rear walls, a front closure, a heating element fixed at the top of said oven and extending in proximity to the side wall of the oven, a lower heating element adjacent the base of the oven of substantially greater capacity than said top heating element such that a baking heat is evenly distributed throughout said oven, means preventing direct radiation from said elements into the oven space, and means for simultaneously energizing said elements.

15. An electric heating arrangement for electric ovens comprising a broiling element, a baking element divided into a plurality of sections, a source of power, switch means operable to one position to connect the sections of said baking elements in parallel across said source for high heat, to a second position to connect said sections in series with said source for low heat, and to a third position to connect said broiling element to said source, and means associated with said switch means for preventing energization of said baking element simultaneously with said broiling element.

16. In combination, three resistance elements and a single rotary snap switch adapted to connect two of said elements in parallel in one of its positions, to connect two of said elements in series in another position and to encircuit a single one of said elements in a third position.

17. In combination, three resistance elements and a single rotary snap switch adapted to connect two of said elements in parallel in one position of the switch, in series in another position, and to encircuit the third one of said elements in a third position.

18. In combination, three resistance elements, two feed lines and a single rotary snap switch adapted to connect two of said elements in parallel across the said lines in one position of the switch, in series in another position and to connect the third one of said elements across the same lines in a third position.

19. In combination, a translating device comprising a resistor and a sectional resistance, said sectional resistance having an intermediate connection point, current supply terminals, and switch means for connecting one terminal with both ends of said resistance in one position, with one end of said resistor in a second position, and with one end of said resistance in a third position, together with other switch means adapted to assume corresponding positions to connect the other terminal with said intermediate point in said one position, with the other end of said resistor in the said second position and with the other end of said resistance in the said third position.

20. An electric heating arrangement for an electric oven comprising a baking element divided into a plurality of sections, a broiling element, a source of power, and a single switch arranged to connect the sections of said baking element in parallel with said source for high baking heat conditions in one position, to connect the sections of said baking element in series with said source for low baking heat conditions in another position, and to disconnect said baking element and to connect said broiling element to said source in a third position.

21. An electric heating arrangement for an electric oven comprising a top baking element, a bottom baking element, a broiling element, a source of power, and a single switch arranged to connect said baking elements in parallel with said source for high baking heat conditions in one position, to connect said baking elements in series with said source for low baking heat conditions in another position, and to connect said broiling element with said source in a third position.

22. An electric heating arrangement comprising a three wire power source including two outside wires and a neutral wire, a plurality of cooking top elements, circuits for a portion of said elements including one outside wire and a neutral wire, circuits for the remainder of the elements including the other outside wire and said neutral wire, a baking unit, a broiler unit, circuits for said units comprising said outside wires, and means for limiting the maximum load on the range comprising switch means providing for the closing of any or all of said cooking top element circuits simultaneously with either said baking unit or said broiler unit circuits and preventing simultaneous closing of the broiling and baking unit circuits irrespective of the cooking top circuits.

23. An electric heating arrangement comprising a three wire power source including two outside wires and a neutral wire, a plurality of cooking top elements, circuits for a portion of said elements including one outside wire and a neutral wire, circuits for the remainder of the elements including the other outside wire and said neutral wire, a baking unit comprising a plurality of sections, a broiler unit, circuits for said units including said outside wires, and switch means providing for closing any selected cooking top circuit, switch means providing for the connection of the sections of said baking unit in series relation and in parallel relation with respect to said outside wires, and means preventing the simultaneous energization of said broiler unit with said baking unit.

24. An electric oven of the character described comprising a lower baking element, an upper baking element having smaller heat capacity than said lower baking element, whereby to secure balanced heat conditions within the oven space, means preventing direct radiation from said elements into said oven, means for energizing said elements, a thermostat having a portion thereof within said oven space and subjected to the heat conditions within said oven space, means including said thermostat providing for coordinated heat control within said oven through said heating elements to connect the same to be energized when the temperature within the oven space, and effective upon the thermostat, falls below a predetermined minimum, said elements when energized supplying heat energy at a rate in excess of that required to maintain the oven with the desired temperature conditions therein, means including said thermostat for effecting de-energizing of said elements when the temperature within the oven space, and effective upon the thermostat, reaches a predetermined maximum value, said upper baking element being positioned above the level of location of the food material being baked to supply heat to be effective in the upper portion of said oven above said food and the lower baking element being positioned below the level of location of the food being baked and to supply heat to be effective within the oven and upon the thermostat therein from below said food, whereby the thermostat is effectively responsive to the desired balanced heat conditions as set up by the coordinated heating elements in the said oven space.

WILLIAM T. BRADBURY.